(12) United States Patent
Langhammer

(10) Patent No.: US 8,577,951 B1
(45) Date of Patent: Nov. 5, 2013

(54) MATRIX OPERATIONS IN AN INTEGRATED CIRCUIT DEVICE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 559 days.

(21) Appl. No.: 12/859,449

(22) Filed: Aug. 19, 2010

(51) Int. Cl.
*G06F 17/16* (2006.01)

(52) U.S. Cl.
USPC .......................................... 708/607

(58) Field of Classification Search
None
See application file for complete search history.

(56) References Cited

U.S. PATENT DOCUMENTS

| | | | |
|---|---|---|---|
| 3,473,160 | A | 10/1969 | Wahlstrom |
| 4,156,927 | A | 5/1979 | McElroy et al. |
| 4,179,746 | A | 12/1979 | Tubbs |
| 4,212,076 | A | 7/1980 | Conners |
| 4,215,406 | A | 7/1980 | Gomola et al. |
| 4,215,407 | A | 7/1980 | Gomola et al. |
| 4,422,155 | A | 12/1983 | Amir et al. |
| 4,484,259 | A | 11/1984 | Palmer et al. |
| 4,521,907 | A | 6/1985 | Amir et al. |
| 4,575,812 | A | 3/1986 | Kloker et al. |
| 4,597,053 | A | 6/1986 | Chamberlin |
| 4,616,330 | A | 10/1986 | Betz |
| 4,623,961 | A | 11/1986 | Mackiewicz |
| 4,682,302 | A | 7/1987 | Williams |
| 4,718,057 | A | 1/1988 | Venkitakrishnan et al. |
| 4,727,508 | A | 2/1988 | Williams |
| 4,736,335 | A | 4/1988 | Barkan |
| 4,777,614 | A * | 10/1988 | Ward .......................... 708/607 |
| 4,791,590 | A | 12/1988 | Ku et al. |
| 4,799,004 | A | 1/1989 | Mori |
| 4,823,295 | A | 4/1989 | Mader |
| 4,839,847 | A | 6/1989 | Laprade |
| 4,871,930 | A | 10/1989 | Wong et al. |
| 4,912,345 | A | 3/1990 | Steele et al. |
| 4,918,637 | A | 4/1990 | Morton |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "FIR Compiler: MegaCore® Function User Guide," version 3.3.0, rev. 1, pp. 3 11 through 3 15 (Oct. 2005).

(Continued)

*Primary Examiner* — David H Malzahn
(74) *Attorney, Agent, or Firm* — Ropes & Gray LLP; Jeffrey H. Ingerman

(57) ABSTRACT

Circuitry can be provided in a fixed logic device, or can be configured into a programmable integrated circuit device such as a programmable logic device (PLD) to perform vector-based matrix operations for matrices of arbitrary size, up to a predetermined maximum size. The circuitry may be used where input row vectors of a matrix are to be combined—e.g., by multiplication—with the same initial vector, which may be one of the rows. Column memories may be provided to hold the input matrix data, so that each row may be read by simultaneously accessing the same index in each column memory. In accordance with the invention, the number of column memories may be less than the actual number of columns so that multiple physical "row access" operations are used to access each logical row. A "circular latch" may be provided to hold the initial vector.

21 Claims, 11 Drawing Sheets

(56) References Cited

U.S. PATENT DOCUMENTS

| | | |
|---|---|---|
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |

(56) References Cited

U.S. PATENT DOCUMENTS

| | | |
|---|---|---|
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,200,631 B2 | 4/2007 | Mailaender et al. |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,930,335 B2 | 4/2011 | Gura |
| 7,930,336 B2 | 4/2011 | Langhammer |
| 7,974,997 B2 | 7/2011 | Arviv et al. |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2007/0083585 A1 | 4/2007 | St. Denis et al. |
| 2007/0185951 A1 | 8/2007 | Lee et al. |
| 2007/0185952 A1 | 8/2007 | Langhammer et al. |
| 2007/0226287 A1 | 9/2007 | Lin et al. |
| 2007/0241773 A1 | 10/2007 | Hutchings et al. |
| 2008/0133627 A1 | 6/2008 | Langhammer et al. |
| 2008/0183783 A1 | 7/2008 | Tubbs |
| 2009/0028455 A1 | 1/2009 | Nakamura et al. |
| 2009/0172052 A1 | 7/2009 | DeLaquil et al. |
| 2009/0187615 A1 | 7/2009 | Abe et al. |
| 2009/0300088 A1 | 12/2009 | Michaels et al. |

(56) References Cited

U.S. PATENT DOCUMENTS

| | | | |
|---|---|---|---|
| 2010/0098189 | A1 | 4/2010 | Oketani |
| 2012/0113133 | A1* | 5/2012 | Shpigelblat ................... 345/619 |
| 2012/0191967 | A1* | 7/2012 | Lin et al. ....................... 713/100 |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO2005/101190 | 10/2005 |

OTHER PUBLICATIONS

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference, D5*, Sep. 2003.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

Altera Corporation, "Stratix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

(56) References Cited

OTHER PUBLICATIONS

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
Lattice Semiconductor Corp, *ORCA® FPGA Express™ Interface Manual: ispLEVER® Version 3.0*, 2002.
Lucent Technologies, Microelectronics Group,"Implementing and Optimizing Multipliers in ORCA™ FPGAs,", Application Note. AP97-008FGPA, Feb. 1997.
"Implementing Multipliers in FLEX 10K EABs", *Altera*, Mar. 1996.
"Implementing Logic with the Embedded Array in FLEX 10K Devices", *Altera*, May 2001, ver. 2.1.
Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.
Jones, G., "Field-programmable digital signal conditioning," *Electronic Product Design*, vol. 21, No. 6, Jun. 2000, pp. C36-C38.
Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.
Kramberger, I., "DSP acceleration using a reconfigurable FPGA," *ISIE '99 Proceedings of the IEEE International Symposium on Industrial Electronics (Cat. No. 99TH8465)*, vol. 3 , Jul. 12-16, 1999, pp. 1522-1525.
Langhammer, M., "How to implement DSP in programmable logic," *Elettronica Oggi*, No. 266 , Dec. 1998, pp. 113-115.
Langhammer, M., "Implementing a DSP in Programmable Logic," *Online EE Times*, May 1998, http:--www.eetimes.com-editorial-1998-coverstory9805.html.
Lazaravich, B.V., "Function block oriented field programmable logic arrays," *Motorola, Inc. Technical Developments*, vol. 18, Mar. 1993, pp. 10-11.
Lund, D., et al., "A new development system for reconfigurable digital signal processing," First International Conference on 3G Mobile Communication Technologies (Conf. Publ. No. 471), Mar. 27-29, 2000, pp. 306-310.
Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.
Mintzer, L., "Xilinx FPGA as an FFT processor," *Electronic Engineering*, vol. 69, No. 845, May 1997, pp. 81, 82, 84.
Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.
Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)* vol. 3, Oct. 28-Nov. 1, 1991, pp. 2014-2018.
Papenfuss, J.R, et al., "Implementation of a real-time, frequency selective, RF channel simulator using a hybrid DSP-FPGA architecture," *RAWCON 2000: 2000 IEEE Radio and Wireless Conference (Cat. No. 00EX404)* , Sep. 10-13, 2000, pp. 135-138.
Parhami, B., "Configurable arithmetic arrays with data-driven control," *34th Asilomar Conference on Signals, Systems and Computers*, vol. 1, 2000, pp. 89-93.
"The QuickDSP Design Guide", Quicklogic, Aug. 2001, revision B.
"QuickDSP™ Family Data Sheet", *Quicklogic*, Aug. 7, 2001, revision B.
Rangasayee, K., "Complex PLDs let you produce efficient arithmetic designs," *EDN (European Edition)*, vol. 41, No. 13, Jun. 20, 1996, pp. 109, 110, 112, 114, 116.
Rosado, A., et al., "A high-speed multiplier coprocessor unit based on FPGA," *Journal of Electrical Engineering*, vol. 48, No. 11-12, 1997, pp. 298-302.
Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)*, Jul. 26-28, 1999, pp. 147-150.
Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.
Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.
Tralka, C., "Symbiosis of DSP and PLD," *Elektronik*, vol. 49, No. 14 , Jul. 11, 2000, pp. 84-96.
Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.
Valls, J., et al., "A Study About FPGA-Based Digital Filters," *Signal Processing Systems*, 1998, SIPS 98, 1998 IEEE Workshop, Oct. 10, 1998, pp. 192-201.
"Virtex-II 1.5V Field-Programmable Gate Arrays", *Xilinx*, Jan. 25, 2001, module 2 of 4.
"Virtex-II 1.5V Field-Programmable Gate Arrays", *Xilinx*, Apr. 2, 2001, module 1 of 4.
"Virtex-II 1.5V Field-Programmable Gate Arrays", *Xilinx*, Apr. 2, 2001, module 2 of 4.
Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.
Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.
Wenzel, L., "Field programmable gate arrays (FPGAs) to replace digital signal processor integrated circuits," *Elektronik* , vol. 49, No. 5, Mar. 7, 2000, pp. 78-86.
"Xilinx Unveils New FPGA Architecture to Enable High-Performance, 10 Million System Gate Designs", *Xilinx*, Jun. 22, 2000.
"Xilinx Announces DSP Algorithms, Tools and Features for Virtex-II Architecture", *Xilinx*, Nov. 21, 2000.
Xilinx Inc., "Virtex-II 1.5V Field-Programmable Gate Arrays", Advance Product Specification, DS031-2 (v1.9), Nov. 29, 2001, Module 2 of 4, pp. 1-39.
Xilinx Inc., "Using Embedded Multipliers", Virtex-II Platform FPGA Handbook, UG002 (v1.3), Dec. 3, 2001, pp. 251-257.
Xilinx, Inc., "A 1D Systolic FIR," copyright 1994-2002, downloaded from http:--www.iro.umontreal.ca-~aboulham-F6221-Xilinx%20A%201D%20systolic%20FIR.htm.
Xilinx, Inc., "The Future of FPGA's," White Paper, available Nov. 14, 2005 for download from http:--www.xilinx.com-prs_rls,5yrwhite.htm.
Xilinx Inc., "XtremeDSP Design Considerations User Guide," v 1.2, Feb. 4, 2005.
Xilinx Inc., "Complex Multiplier v2.0", DS291 Product Specification/Datasheet, Nov. 2004.
Haynes, S.D., et al., "Configurable multiplier blocks for embedding in FPGAs," *Electronics Letters*, vol. 34, No. 7, pp. 638-639 (Apr. 2, 1998).
Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

\* cited by examiner $$\begin{bmatrix} \ell_{11} & & & & & \\ \ell_{21} & \ell_{22} & & & & \\ \ell_{31} & \ell_{32} & \ell_{33} & & & \\ \ell_{41} & \ell_{42} & \ell_{43} & \ell_{44} & & \\ \ell_{51} & \ell_{52} & \ell_{53} & \ell_{54} & \ell_{55} & \\ \ell_{61} & \ell_{62} & \ell_{63} & \ell_{64} & \ell_{65} & \ell_{66} \end{bmatrix}$$

500

501

ROW 0

| (0,0) | | | |
|---|---|---|---|
| | | | |
| | | | |

ROW 1

| (1,0) | (1,1) | | |
|---|---|---|---|
| | | | |
| | | | |

ROW 2

| (2,0) | (2,1) | (2,2) | |
|---|---|---|---|
| | | | |
| | | | |

501

ROW 3

| (3,0) | (3,1) | (3,2) | (3,3) |
|---|---|---|---|
| | | | |
| | | | |

ROW 4

| (4,0) | (4,1) | (4,2) | (4,3) |
|---|---|---|---|
| (4,4) | | | |
| | | | |

501

ROW 5

| (5,0) | (5,1) | (5,2) | (5,3) |
|---|---|---|---|
| (5,4) | (5,5) | | |
| | | | |

ROW 6

| (6,0) | (6,1) | (6,2) | (6,3) |
|---|---|---|---|
| (6,4) | (6,5) | (6,6) | |
| | | | |

501

ROW 7

| (7,0) | (7,1) | (7,2) | (7,3) |
|---|---|---|---|
| (7,4) | (7,5) | (7,6) | (7,7) |
| | | | |

FIG. 5A

ROW 8

| (8,0) | (8,1) | (8,2) | (8,3) |
|-------|-------|-------|-------|
| (8,4) | (8,5) | (8,6) | (8,7) |
| (8,8) |       |       |       |

ROW 9

| (9,0) | (9,1) | (9,2) | (9,3) |
|-------|-------|-------|-------|
| (9,4) | (9,5) | (9,6) | (9,7) |
| (9,8) | (9,9) |       |       |

ROW 10

| (10,0) | (10,1) | (10,2)  | (10,3) |
|--------|--------|---------|--------|
| (10,4) | (10,5) | (10,6)  | (10,7) |
| (10,8) | (10,9) | (10,10) |        |

ROW 11

| (11,0) | (11,1) | (11,2)  | (11,3)  |
|--------|--------|---------|---------|
| (11,4) | (11,5) | (11,6)  | (11,7)  |
| (11,8) | (11,9) | (11,10) | (11,11) |

| ADDRESS | MEMORY 1 | MEMORY 2 | MEMORY 3 | MEMORY 4 |
|---|---|---|---|---|
| 0 | (0,0) | | | |
| 1 | | | | |
| 2 | | | | |
| 3 | (1,0) | (1,1) | | |
| 4 | | | | |
| 5 | | | | |
| 6 | (2,0) | (2,1) | (2,2) | |
| 7 | | | | |
| 8 | | | | |
| 9 | (3,0) | (3,1) | (3,2) | (3,3) |
| 10 | | | | |
| 11 | | | | |
| 12 | (4,0) | (4,1) | (4,2) | (4,3) |
| 13 | (4,4) | | | |
| 14 | | | | |
| 15 | (5,0) | (5,1) | (5,2) | (5,3) |
| 16 | (5,4) | (5,5) | | |
| 17 | | | | |
| 18 | (6,0) | (6,1) | (6,2) | (6,3) |
| 19 | (6,4) | (6,5) | (6,6) | |
| 20 | | | | |
| 21 | (7,0) | (7,1) | (7,2) | (7,3) |
| 22 | (7,4) | (7,5) | (7,6) | (7,7) |
| 23 | | | | |
| 24 | (8,0) | (8,1) | (8,2) | (8,3) |
| 25 | (8,4) | (8,5) | (8,6) | (8,7) |
| 26 | (8,8) | | | |
| 27 | (9,0) | (9,1) | (9,2) | (9,3) |
| 28 | (9,4) | (9,5) | (9,6) | (9,7) |
| 29 | (9,8) | (9,9) | | |
| 30 | (10,0) | (10,1) | (10,2) | (10,3) |
| 31 | (10,4) | (10,5) | (10,6) | (10,7) |
| 32 | (10,8) | (10,9) | (10,10) | |
| 33 | (11,0) | (11,1) | (11,2) | (11,3) |
| 34 | (11,4) | (11,5) | (11,6) | (11,7) |
| 35 | (11,8) | (11,9) | (11,10) | (11,11) |

| ADDRESS | MEMORY 1 | MEMORY 2 | MEMORY 3 | MEMORY 4 |
|---|---|---|---|---|
| 0 | (0,0) | | | |
| 1 | (1,0) | (1,1) | | |
| 2 | (2,0) | (2,1) | (2,2) | |
| 3 | (3,0) | (3,1) | (3,2) | (3,3) |
| 4 | (4,0) | (4,1) | (4,2) | (4,3) |
| 5 | (4,4) | | | |
| 6 | (5,0) | (5,1) | (5,2) | (5,3) |
| 7 | (5,4) | (5,5) | | |
| 8 | (6,0) | (6,1) | (6,2) | (6,3) |
| 9 | (6,4) | (6,5) | (6,6) | |
| 10 | (7,0) | (7,1) | (7,2) | (7,3) |
| 11 | (7,4) | (7,5) | (7,6) | (7,7) |
| 12 | (8,0) | (8,1) | (8,2) | (8,3) |
| 13 | (8,4) | (8,5) | (8,6) | (8,7) |
| 14 | (8,8) | | | |
| 15 | (9,0) | (9,1) | (9,2) | (9,3) |
| 16 | (9,4) | (9,5) | (9,6) | (9,7) |
| 17 | (9,8) | (9,9) | | |
| 18 | (10,0) | (10,1) | (10,2) | (10,3) |
| 19 | (10,4) | (10,5) | (10,6) | (10,7) |
| 20 | (10,8) | (10,9) | (10,10) | |
| 21 | (11,0) | (11,1) | (11,2) | (11,3) |
| 22 | (11,4) | (11,5) | (11,6) | (11,7) |
| 23 | (11,8) | (11,9) | (11,10) | (11,11) |

FIG. 8

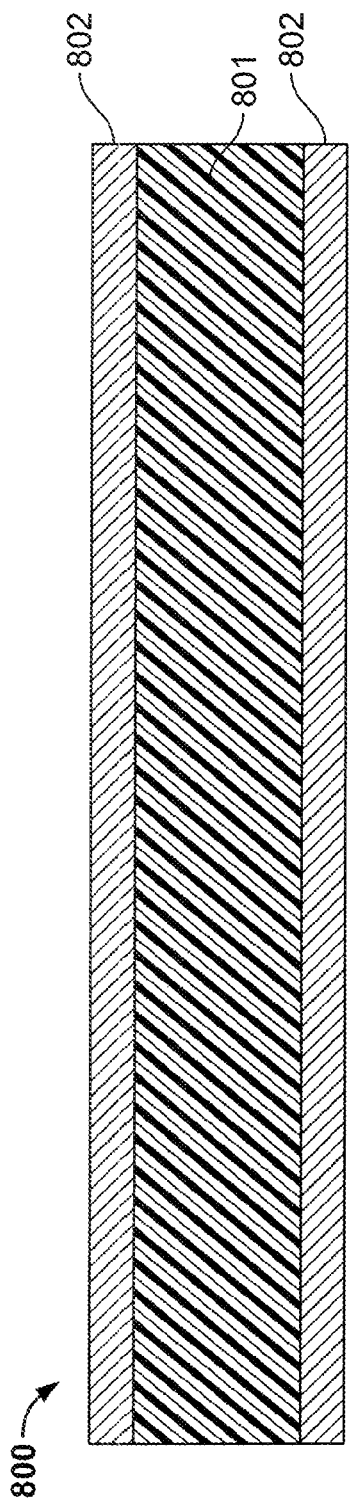
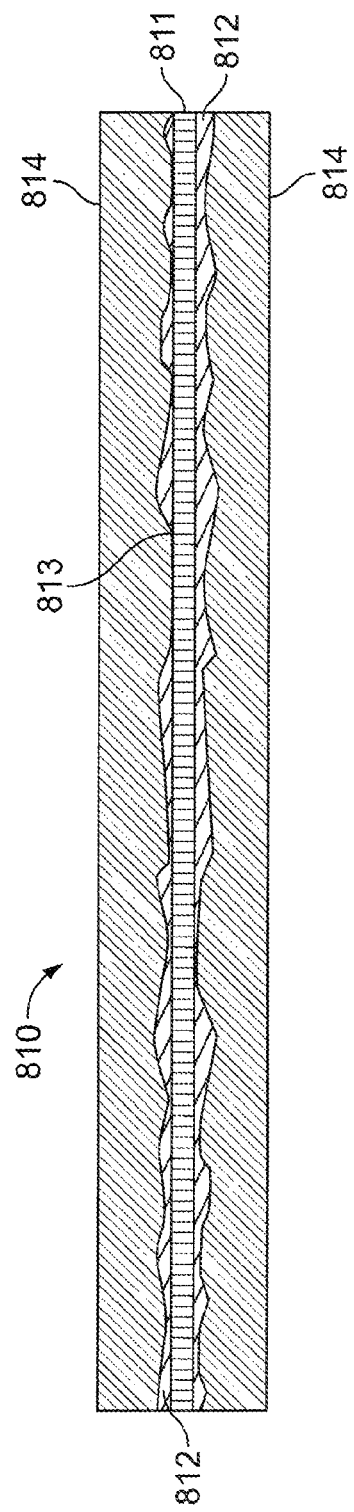
FIG. 9
FIG. 10

US 8,577,951 B1

MATRIX OPERATIONS IN AN INTEGRATED CIRCUIT DEVICE

BACKGROUND OF THE INVENTION

This invention relates to performing matrix operations in integrated circuit devices, and particularly in programmable integrated circuit devices such as programmable logic devices (PLDs).

Matrix operations on large matrices are becoming more common. For some technical problems, solutions may involve matrices as large as 256-by-256. For example, it may be necessary to factor and/or invert a large matrix, or to solve for the eigenvalues of a large matrix. However, while a vector-based approach may be useful for performing such operations, providing the resources for such large vector-based solutions may be problematic, particularly where the size of the matrices may differ. This may particularly be the case in programmable devices, where different users may require resources for vector-based matrix operations of different sizes.

SUMMARY OF THE INVENTION

The present invention relates to circuitry for performing vector-based matrix operations for matrices of arbitrary size, up to a predetermined maximum size. The circuitry can be provided in a fixed logic device, or can be configured into a programmable integrated circuit device such as a programmable logic device (PLD).

The present invention may be used where all input row vectors of a matrix are to be combined—e.g., by multiplication—with the same initial vector, which may be one of the rows. Column memories may be provided to hold the input matrix data, so that each row may be read by simultaneously accessing the same index in each column memory. In accordance with the invention, the number of column memories may be less than the actual number of columns so that multiple physical "row access" operations are used to access each logical row. A "circular latch" may be provided to hold the initial vector.

The size of the circular latch may be matched to that of the column memories in that the circular latch may include a plurality of rows each having the same number of memories as there are column memories, with the number of rows corresponding to the maximum number of "row access" operations needed per row of the input matrix, which may vary from row to row, even within the same matrix, as discussed below. In a fixed-logic device, the total number of memories may be determined in advance based on the intended application. In a programmable device, there may be no limit, as the memories from which the circular latch is constructed may be freely available as parts of the logic elements of the device. Alternatively, a programmable device may be provided with a number of dedicated memories available for configuration as part of the circular latch, so that user configurations would be limited by that number.

Therefore, in accordance with the present invention, there is provided matrix operations circuitry for performing a vector operation on an input matrix having a first number of columns, where the vector operation includes operations combining one row of the matrix and each row of the matrix. The matrix operations circuitry includes a first set of a second number of column memories, where the second number is smaller than the first number, so that at least one row of the input matrix is stored in multiple rows of the column memories. The matrix operations circuitry also includes a vector operations circuit that performs the operations combining a selected row of the matrix and each row of the matrix, and a first set of first input registers equal in number to the second number, for inputting each row to the vector operations circuit from the column memories. The matrix operations circuitry further includes a first set of second input registers equal in number to the second number, for inputting that one row to the vector operations circuit, a first circular latch for storing that one row, and selection circuitry for circulating values from the selected row between the first set of second input registers and the first circular latch.

A method of configuring such circuitry on a programmable device, and a machine-readable data storage medium encoded with software for performing the method, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIGS. 5A and 5B (hereinafter collectively referred to as "FIG. 5") show a logical representation of memory organized in accordance with an embodiment of the present invention;

FIG. 6 shows a physical representation of memory organized in accordance with an embodiment of the present invention;

FIG. 8 shows a physical representation of memory organized in accordance with another embodiment of the present invention;

FIG. 9 is a cross-sectional view of a magnetic data storage medium encoded with a set of machine-executable instructions for performing the method according to the present invention;

FIG. 10 is a cross-sectional view of an optically readable data storage medium encoded with a set of machine executable instructions for performing the method according to the present invention.

DETAILED DESCRIPTION OF THE INVENTION

The present invention may be used to configure circuitry for any class of matrix operations involving multiplication of a series of vectors by a single initial vector. For purposes of illustration, an embodiment of the invention will be described in connection with the Cholesky decomposition of a triangulated matrix—i.e., a square matrix having no values (or all zero values) above the diagonal—such as that described in copending, commonly-assigned U.S. patent application Ser.

No. 12/557,846, filed Sep. 11, 2009, which is hereby incorporated by reference herein in its entirety.

Figures 1, 2:
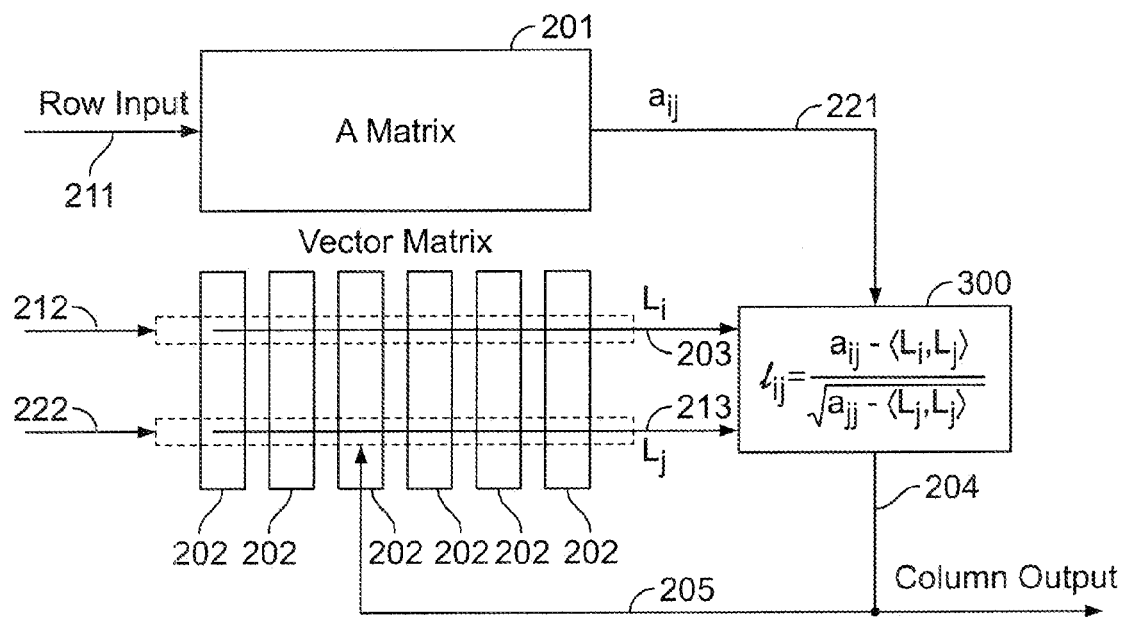
FIG. 1 shows an example resultant matrix of a Cholesky decomposition operation.
FIG. 2 shows one embodiment of a datapath arrangement for Cholesky decomposition.

An example 100 of a triangulated matrix l resulting from a lower-form Cholesky decomposition is shown in FIG. 1. Although the size of matrix l may differ, matrix l will always be a square matrix. In this case, matrix l is a 6-by-6 matrix. The elements on the diagonal are $l_{11}, \ldots, l_{66}$. In each jth column, the elements under $l_{jj}$ are $l_{ij}$, $i=j_{+1}, \ldots, i_{max}$ (in this case, $i_{max}=6$). The matrix may be considered to be empty above the diagonal, or the elements above the diagonal may be considered to be zeroes.

As described in the above-incorporated copending application, each element $l_{ij}$ can be calculated using two datapaths. The first datapath calculates the following result:

$$l_x = a_x - \langle L_x, L_x \rangle$$

where for l and a, x=ij; for the L vectors, x=i or j, respectively; and $\langle L_x, L_x \rangle$ denotes the inner product of the L vectors.

The first output (x=jj) of the first datapath is latched at the input of a second datapath, which calculates the actual $l_{ij}$. The first element of the column ($l_{jj}$) is calculated as the inverse square root of the input ($a_{jj} - \langle L_j, L_j \rangle$), multiplied by the input, generating the square root of the input. The inverse square root is used instead of a direct square root calculation, because it can be reused for the following elements in the column using multiplication, which is easier to implement than division.

To calculate all of the subsequent values in the column, the latched first datapath output is used for the inverse square root input which is a first multiplier input, and the other multiplier input is, for each subsequent term, the corresponding output of the first datapath. The entire column can therefore be calculated without waiting for any individual element to be finished.

FIG. 2 shows how the matrix values are stored as described in the above-incorporated copending application. Each $a_{ij}$ value is a single number that can be addressed in a single clock cycle, but each $L_i$ or $L_j$ row vector is j−1 numbers which would require j−1 clock cycles to address if all values were stored in a single memory. However, in accordance with the above-incorporated copending application, matrix a may be stored in a single memory 201, while each column of matrix l may be stored in one of a plurality of $i_{max}$ separate memories 202. The ith element of each of the separate column memories can be addressed simultaneously, allowing the entire row vector to be read out within a single clock cycle. This may be referred to as a "column-wise" memory architecture.

For example, programmable logic devices available from Altera Corporation, of San Jose, Calif., may have a smaller number of larger memory blocks (e.g., 144 kb memory blocks), one of which could be used as memory 201 to store matrix a, and a larger number of smaller memory blocks (e.g., 9 kb memory blocks), $i_{max}$ of which could be used as memories 202 to separately store the columns of matrix l. Of course, it is not necessary to use different sizes of memories for memories 201, 202; if a sufficient number of larger memories is available, any one or more of the memories used as column memories 202 to separately store the columns of matrix l may be the same size as (or even larger than) the memory used as memory 201 to store matrix a.

Thus, in a single clock cycle, address input 211 may be applied to memory 201 to read out matrix element $a_{ij}$ at 221 for input to calculation datapath 300, while address input 212 may be applied to the appropriate j−1 memories 202 on path 203 to read out vector $L_i$, and address input 222 may be applied to the appropriate j−1 memories 202 on path 213 to read out vector $L_j$. The outputs 221, 203, 213 maybe input to calculation datapath 300, described in more detail in connection with FIG. 3, which outputs the individual $l_{ij}$ values at 204, and also feeds each back at 205 into the respective jth column memory 202.

Datapath 300, which may be implemented in fixed or programmable logic, includes inner product datapath 301 and inverse square root datapath 302.

Inner product datapath 301 includes inner product generator 311 and subtractor 321 to subtract the inner product from $a_{ij}$. Inner product generator 311 may include a sufficient plurality of multipliers and adders to simultaneously multiply $i_{max}$ pairs of values, and then add those products together. For complex vectors, inner product generator 311 may include sufficient multipliers and adders to simultaneously multiply 2 ($i_{max}$) pairs of values, and also may include the necessary components to compute the complex conjugate values for $L_j$ in the case where the values are complex. The $L_j$ term is latched in register 331 at the beginning of a column process and is not changed until the next column is started.

Starting with the second column, the first output of inner product datapath 301 for each column—i.e., each $l_{jj}$—is latched into register 312 as the input to inverse square root datapath 302 for the duration of calculation of that column. Inverse square root datapath 302 includes inverse square root module 322 for calculating the inverse square root of $l_{jj}$, and multiplier 332 for multiplying the inverse square root by the current $l_{ij}$. The latching of $l_{jj}$ into register 312 delays its input to multiplier 332 by one clock cycle. Therefore, the input of $l_{ij}$ to multiplier 332 also is delayed, by register 342, so that latency is the same for both inputs.

For the first column, terms are generated using division. The top term, $l_{11}$ is $a_{11}^{0.5}$ and all the subsequent inputs for the first column are divided by the top term so that $l_{i1}=a_{i1}/a_{11}^{0.5}=a_{i1}\times a_{11}^{-0.5}$. This is accomplished using multiplexer 350 to allow the $a_{ij}$ inputs 351 to bypass inner product datapath 301.

Figure 3:
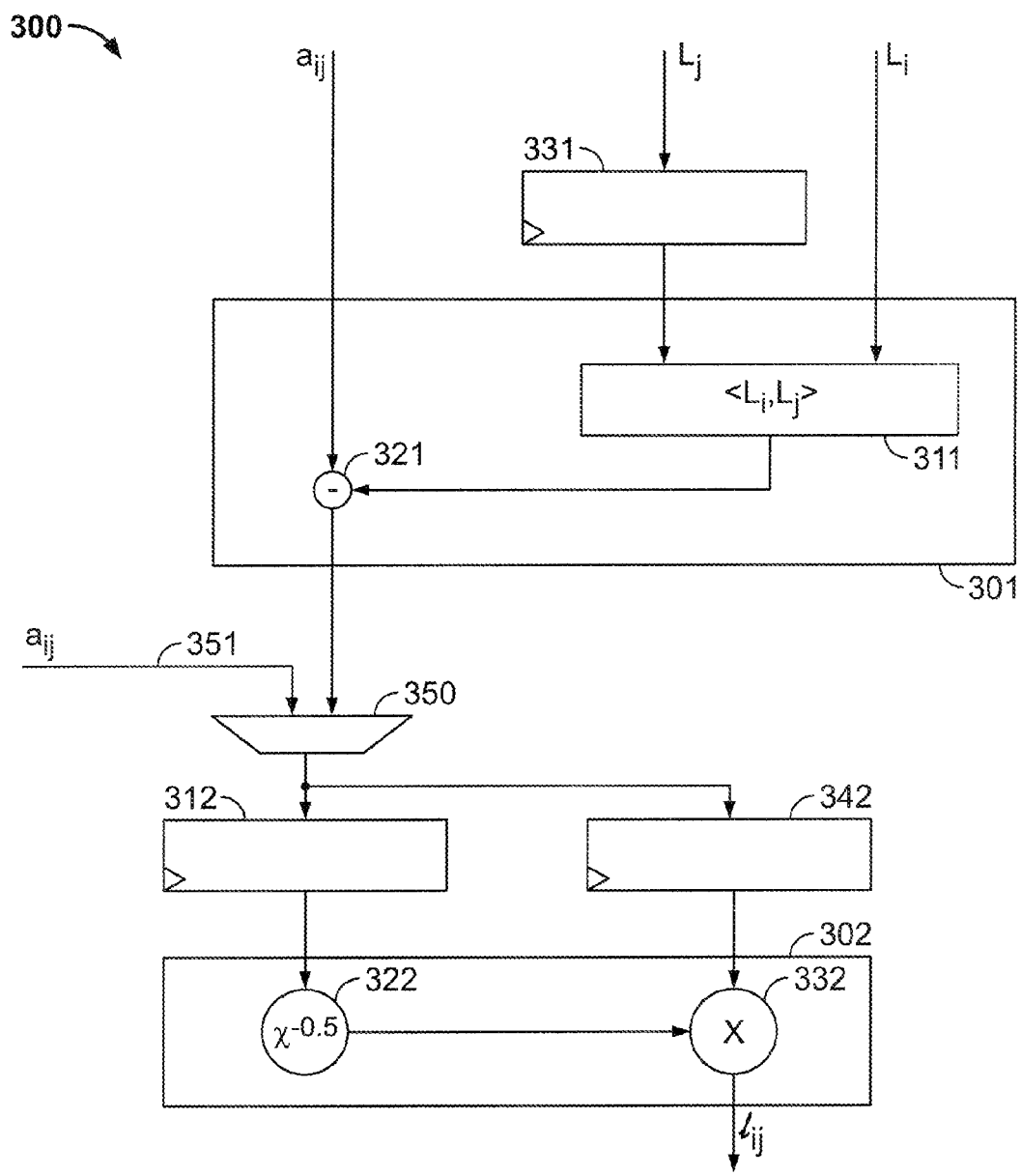
FIG. 3 shows one embodiment of a circuit arrangement used in the performance of Cholesky decomposition.

In the example of FIGS. 1-3, as described in the above-incorporated copending application, the matrix is a relatively small 6-by-6 matrix. However, those techniques may become impractical as matrices become larger. Accordingly, the present invention provides circuitry, and a technique, that is useful even with larger matrices, as well as with smaller matrices.

In accordance with the present invention, one can define matrix size to refer to the number of rows and columns in the matrix. For a given matrix size, the user may choose a given vector processing size. The vector processing size is the number of elements of a row of the input matrix that are processed at one time, although it should be noted that for some applications, the invention may be implemented on a column basis instead of a row basis. Thus, for each row (or column), there will be a number of partial inner product results. A parallel adder may be used to sum those partial inner product results. The adder size is determined based on the number of partial results to be added.

In an embodiment implemented in a programmable logic device, programming software for the programmable logic device may include a library containing a set of precompiled circuit configurations for vector multiplication blocks and adders of varying sizes that may be needed for matrices of different sizes and different vector processing sizes.

A number of data memories may be provided, and may be accessed in parallel to extract a portion of a row of the matrix in a single clock cycle. The number of data memories preferably is the same as the vector processing size. For real matrices, only a single set of memories is needed, while for complex matrices, a separate set of real and imaginary memories may be used. As an alternate embodiment in the complex case, the real and imaginary portions of any element could be stored in a single larger memory—e.g., having twice the data width.

As described above in connection with FIGS. 1-3, each element of a column is determined based on the inner products of the corresponding row vectors. The same is true in embodiments of the present invention. The first column may processed as it is input or, alternatively, after it is loaded.

Figure 4:
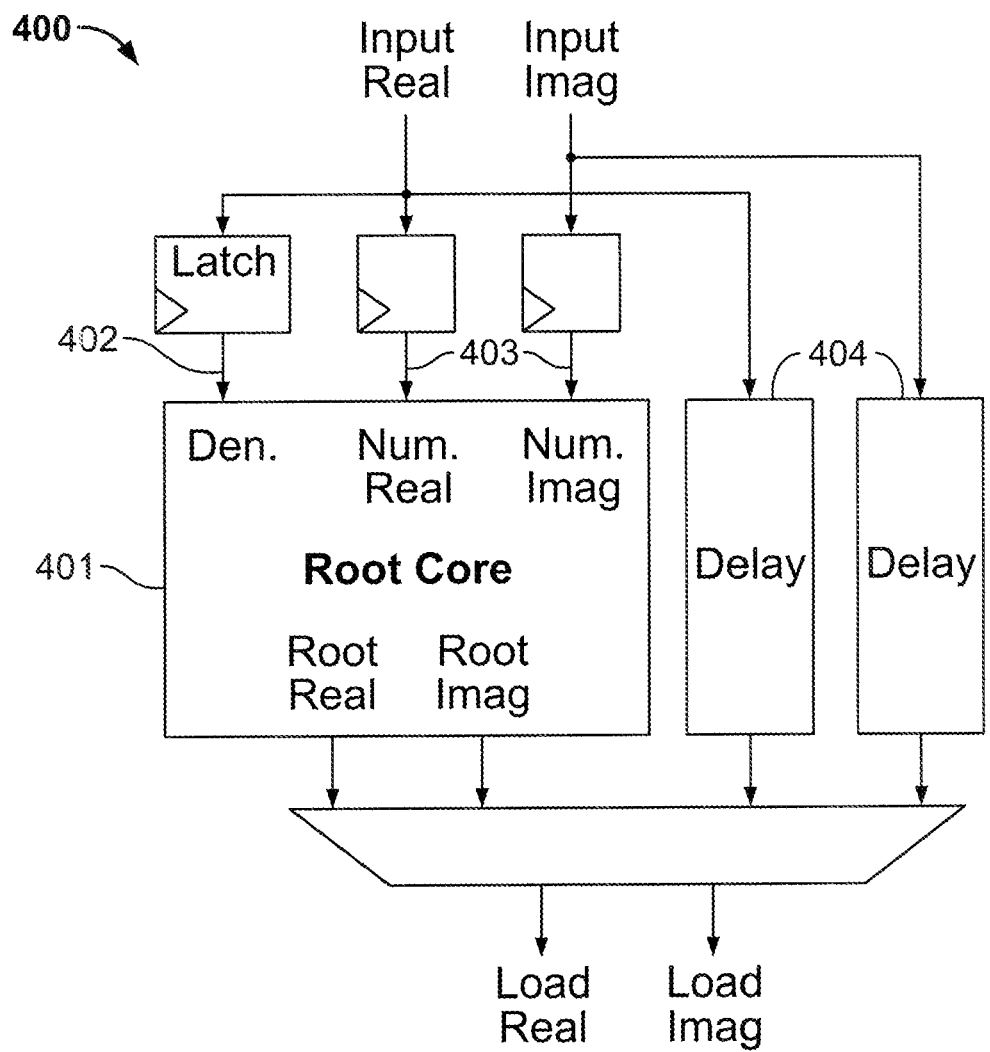
FIG. 4 shows one embodiment of an input datapath circuit arrangement in accordance with the present invention.
Figure 7A:
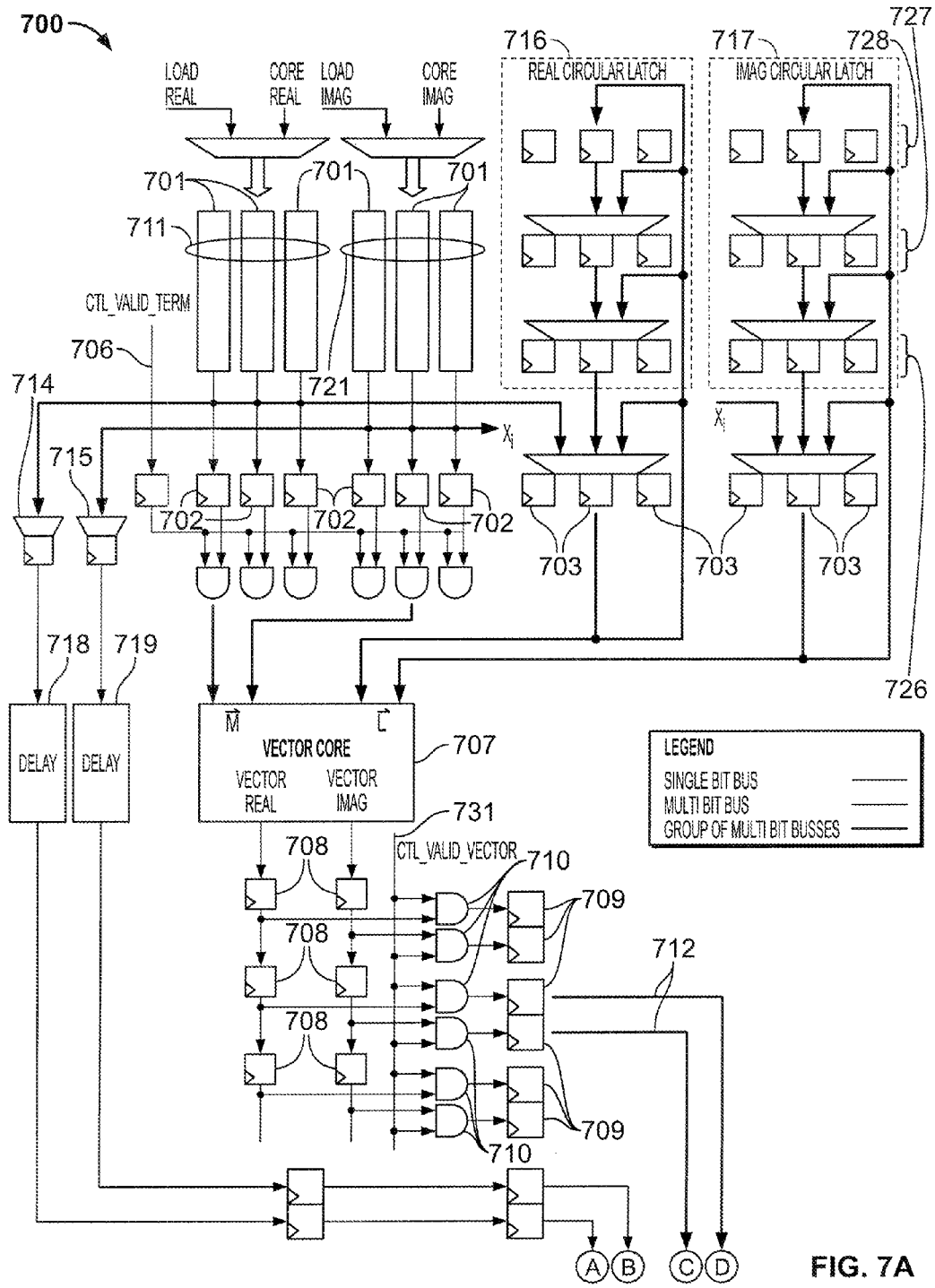
FIGS. 7A and 7B (hereinafter collectively referred to as "FIG. 7") show a circuit arrangement used in the performance of Cholesky decomposition in accordance with an embodiment of the present invention.
Figure 7B:
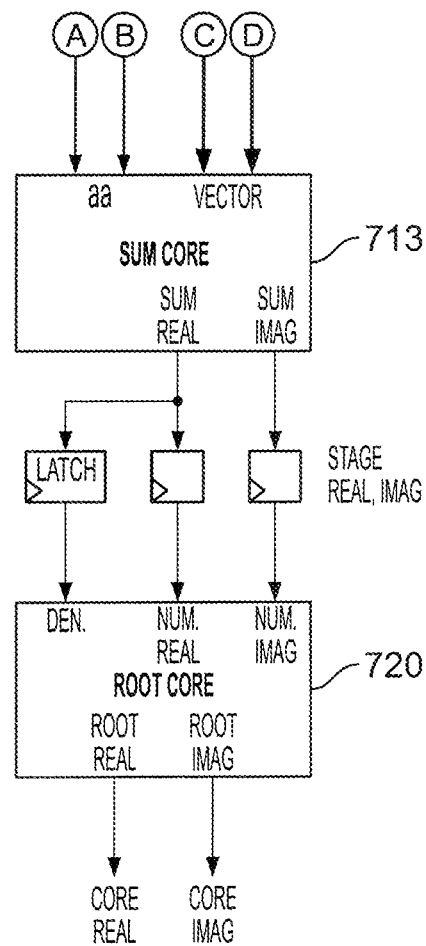

FIG. 4 shows a block diagram of the datapath 400 of the input block for the Cholesky decomposition example, in which data for the first row is used in the square root calculation described above. As shown, datapath 400 includes a square root processing block 401 which may be used on the first-row data before they are input to memories 701 (FIG. 7). During input of data for subsequent rows, the data bypass square root processing block 401 and are input directly into memories 701. Delays 404 may be provided to compensate for the latency of square root processing block 401 in processing the first row. The first value (matrix index {0,0}) may be latched into the denominator input 402 of square root processing block 401 for reuse. Even for a complex matrix, this value will be real (as are all the values on the diagonal), so only a real component needs to be latched. That first value, and all subsequent values of the first column are also input into the numerator 403 of square root processing block 401. Square root processing block 401 multiplies the inverse square root of the denominator input 402 with the complex numerator input 403. As the denominator input is always real, one real inverse square root component and two real multipliers are required. An identical square root processing block is used elsewhere in the main part of the calculation as described below, and it is also possible to reuse the same square root processing block for both parts of the calculation, by providing appropriate multiplexing.

FIGS. 5 and 6 illustrate the example of a 12-by-12 matrix with a vector processing size of four, which means that each row is represented by a 4-by-3 submatrix. This logical representation 500 may be seen in FIG. 5 where each row is represented by a respective submatrix 501. FIG. 6 shows the physical storage of that same data in a memory 600, illustrated in the form of a table. In the example of FIGS. 5 and 6, the input matrix is triangulated, so not all rows completely fill their respective submatrices. However, the adder size has to be able to accommodate the largest submatrices which, in this example, would require three separate accesses, so the adder size in this example is three. In alternative embodiments the matrix size might not be the product of the vector processing size and the adder size, but the submatrices preferably would still have a number of rows equal to the vector processing size and a number of columns equal to the adder size.

As seen in FIG. 6, a vector processing size of four means that four memories 601, 602, 603, 604 would be used, each containing a number of columns from the input matrix. In this example, the first memory 601 contains columns 0, 4, and 8, as can be seen from the column indices of the individual memory elements.

FIG. 7 shows an architecture 700 according to an embodiment of the invention which may, for example, be used for the Cholesky decomposition described above. In this example, the number of input column memories 701 is three, rather than four, but this is exemplary only. Memories 701 are provided in two groups 711, 721 for processing the real and imaginary parts, respectively.

Each partial row is read from the column memories 701 into the memories 702. The partial row data for the first row also are read into memories 703 at the outputs of circular latches 716, 717 (only one of which is needed if imaginary values are not being used). ctrl_valid_term signal 706 may be used to zero out any contribution from a column memory that does not contain valid data (e.g., from positions corresponding to the upper, empty half of a triangulated matrix). Memories 702 function as staging registers to (1) break up the routing path for higher system speeds, and (2) equalize the delays into vector processing block 707 from memories 701 and from circular latches 716, 717

The vector multiplication processing for the inner product (for the real part, and also, if present, for the imaginary part) may be carried out in vector processing block 707. The partial results may be delayed by pipeline registers 708 and combined in registers 709. Gates 710, under control of ctl_valid_vector signal 731, prevent data in pipeline registers 708 that is not to be added (e.g., data from empty subrows in FIG. 5) from passing to registers 709.

For this Cholesky decomposition example, sum processing block 713 adds the reconstituted inner product(s) 712 and subtracts that sum from the current $a_{ij}/a_{jj}$, which is selected from the row vector for the current output column by multiplexer 714, 715 for the real and imaginary paths, respectively. In the first column of each group, the $a_{ij}/a_{jj}$ value will be the first element in the last row of the current sub-matrix.

The first row may be processed during or just after loading, with the same values in registers 702 and 703. The values from registers 703 are then multiplexed into the correct row of respective circular latch 716, 717 (only one would be used if there is no imaginary part). For example, the first sub-row may be stored into row 726 of circular latch 716, 717, the second sub-row may be stored into row 727, the third sub-row may be stored into row 728, etc.

For the second and subsequent rows, the input column memories 701 may be accessed in parallel and read into memories 702. The respective sub-row from circular latch 716, 717 is read into memories 703. After the values in memories 702, 703 are entered into vector processing block 707, the remaining values in circular latch 716, 717 move down one row, with the next sub-row now in memories 703, and the values previously in memories 703 are circulated back to the topmost used row (based on the adder size of the current configuration) of circular latch 716, 717. The latch control signal preferably is aligned with the start of the column as it only happens once per column. With each subsequent group, the latch signal is advanced one clock less. Each circular latch 716, 717 is clocked at the same rate as the reads from the input column memories 701, and therefore the same indexed sub-row of the latched vector would be aligned with the current indexed sub-row of the current input vector.

The $a_{ij}/a_{jj}$ term may be delayed by delay 718, 719 (again, there is only one if complex numbers are not involved) so that it arrives at the input of sum processing block 713 at the same time as when the current set of vector products 712.

The first result of sum processing block 713 may be latched at the input of square root processing block 720, and then each sum result (including the first one) is streamed through square root processing block 720, to generate the individual elements of the current output column. As noted above, a single square root processing block can be used as both square root processing block 701 and square root processing block 720, by providing appropriate multiplexing (not shown).

The physical memory structure shown in FIG. 6 can be further optimized for area, by eliminating the unused rows, with the trade-off of more complex addressing requirements. An optimized memory map 750 for a 12-by-12 matrix is shown in FIG. 8. For larger matrices approaching 256-by- 256, such optimization can save a considerable amount of memory. Indeed, typical savings may be on the order of about 40%.

Although described above in the context of Cholesky decomposition, the present invention may be implemented in other embodiments for a variety of vector-based matrix operations. Therefore, in some of those embodiments, some of the structures included in with the embodiments described above, such as sum processing block 713, or square root processing blocks 401, 720, may not be included, but those embodiments would still be within the present invention.

The structures described above may be provided in fixed logic, in which case the sizes of the various computational components may be fixed to a particular application. Alternatively, the fixed logic circuitry could allow for limited parameterization. For example, circular latches of a certain size may be provided, but it may be possible to select how many rows are used, allowing the circuitry to be used for matrices up to that size.

Another potential use for the present invention may be in programmable integrated circuit devices such as programmable logic devices, where programming software can be provided to allow users to configure a programmable device to perform matrix operations. Where the programmable device is provided with a certain number of dedicated blocks for arithmetic functions (to spare the user from having to configure arithmetic functions from general-purpose logic), many of the computational components may be configured from those blocks. Others may be configured from the programmable resources. For example, memories associated with different individual logic elements may be connected to form the aforementioned circular latches.

Instructions for carrying out a method according to this invention for programming a programmable device to perform matrix decomposition may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

FIG. 9 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 10 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 11:
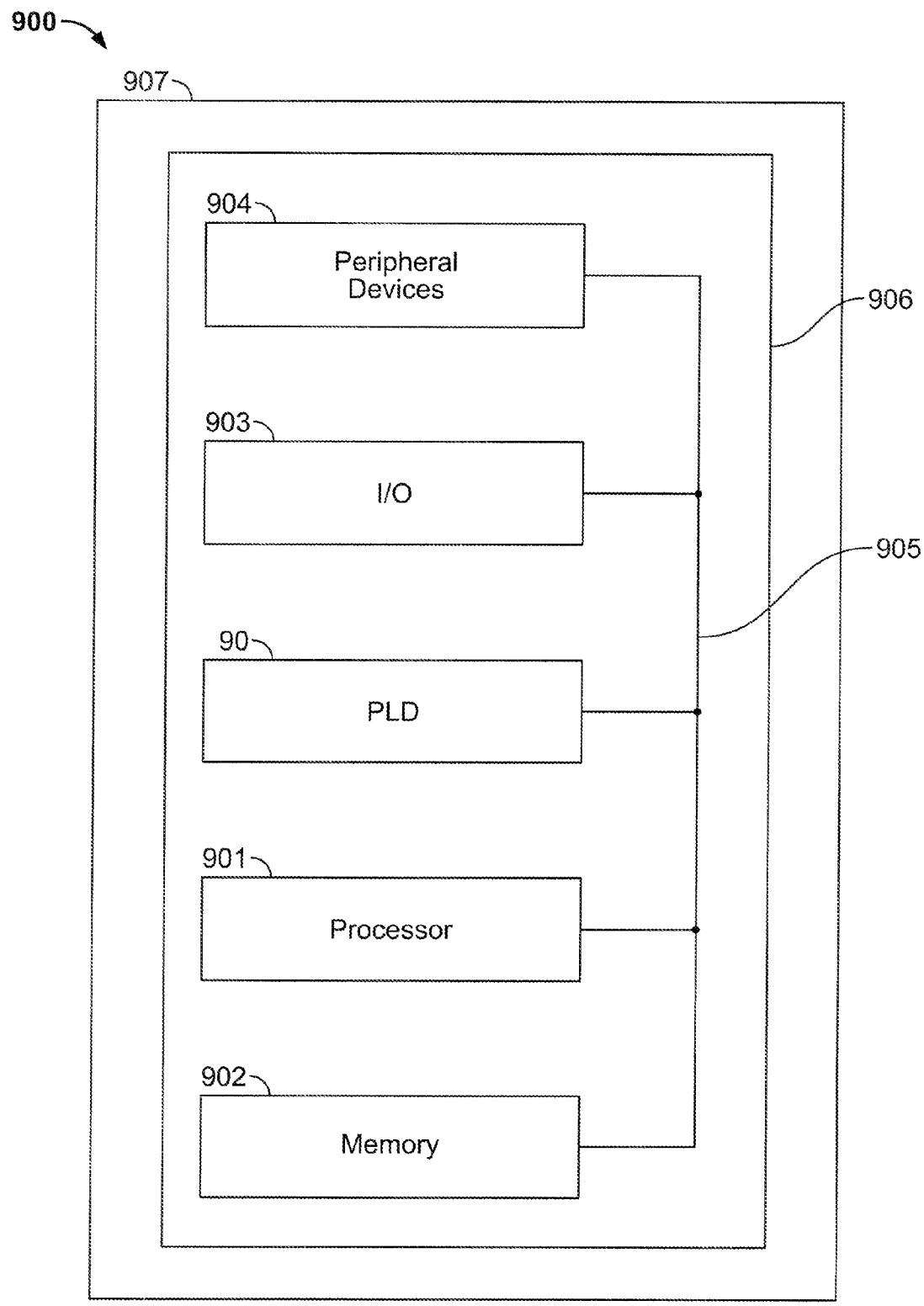
FIG. 11 is a simplified block diagram of an illustrative system employing a programmable logic device incorporating the present invention.

A PLD 90 programmed according to the present invention may be used in many kinds of electronic devices. One possible use is in a data processing system 900 shown in FIG. 11. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Matrix operations circuitry for performing a vector operation on an input matrix having a first number of columns, said vector operation including operations combining one row of said matrix and each row of said matrix, said matrix operations circuitry comprising:
   a first set of a second number of column memories, said second number being smaller than said first number, whereby at least one row of said input matrix is stored in multiple rows of said column memories;
   a vector operations circuit that performs said operations combining a selected row of said matrix and each row of said matrix;
   a first set of first input registers equal in number to said second number, for inputting each said row to said vector operations circuit from said column memories;
   a first set of second input registers equal in number to said second number, for inputting said one row to said vector operations circuit;
   a first circular latch for storing said one row; and
   selection circuitry for circulating values from said selected row between said first set of second input registers and said first circular latch.

2. The matrix operations circuitry of claim 1 further comprising, for performing complex operations:
   a second set of said second number of column memories for storing an imaginary part of said input matrix;
   a second set of first input registers equal in number to said second number, for inputting an imaginary part of each said row to said vector operations circuit from said column memories;
   a second set of second input registers equal in number to said second number, for inputting an imaginary part of said one row to said vector operations circuit; and
   a second circular latch for storing an imaginary part of said one row; wherein:
   said selection circuitry further circulates values from an imaginary part of said selected row between said second set of second input registers and said second circular latch.

3. The matrix operations circuitry of claim 1 further comprises preprocessing circuitry that performs a preprocessing operation on said selected row.

4. The matrix operations circuitry of claim 3 wherein said preprocessing circuitry performs said preprocessing operation during loading of said selected row into said column memories.

5. The matrix operations circuitry of claim 4 wherein said preprocessing circuitry performs said preprocessing operation after loading of said selected row into said column memories.

6. The matrix operations circuitry of claim 3 wherein:
   said preprocessing operation is an operation that also is performed later in said vector operation; and
   said preprocessing circuitry also is used to perform said preprocessing operation later in said vector operation.

7. The matrix operations circuitry of claim 1 wherein:
   said circular latch comprises a plurality of memories arranged in a number of circular latch columns equal to said second number, and a number of circular latch rows equal to said multiple rows; and
   said selection circuitry comprises multiplexing circuitry for selectably accepting input into each of at least some of said circular latch rows from one of (a) another of said circular latch rows, and (b) said second input registers.

8. A method of configuring a programmable integrated circuit device as matrix operations circuitry for performing a vector operation on an input matrix having a first number of columns, said vector operation including operations combining one row of said matrix and each row of said matrix, said method comprising:
   configuring logic of said programmable integrated circuit device as a first set of a second number of column memories, said second number being smaller than said first number, whereby at least one row of said input matrix is stored in multiple rows of said column memories;
   configuring logic of said programmable integrated circuit device as a vector operations circuit that performs said operations combining a selected row of said matrix and each row of said matrix;
   configuring logic of said programmable integrated circuit device as a first set of first input registers equal in number to said second number, for inputting each said row to said vector operations circuit from said column memories;
   configuring logic of said programmable integrated circuit device as a first set of second input registers equal in number to said second number, for inputting said one row to said vector operations circuit;
   configuring logic of said programmable integrated circuit device as a first circular latch for storing said one row; and
   configuring logic of said programmable integrated circuit device as selection circuitry for circulating values from said selected row between said first set of second input registers and said first circular latch.

9. The method of claim 8 further comprising, for configuring said programmable integrated circuit device to perform complex operations:
   configuring logic of said programmable integrated circuit device as a second set of said second number of column memories for storing an imaginary part of said input matrix;
   configuring logic of said programmable integrated circuit device as a second set of first input registers equal in number to said second number, for inputting an imaginary part of each said row to said vector operations circuit from said column memories;
   configuring logic of said programmable integrated circuit device as a second set of second input registers equal in number to said second number, for inputting an imaginary part of said one row to said vector operations circuit; and
   configuring logic of said programmable integrated circuit device as a second circular latch for storing an imaginary part of said one row; wherein:
   said selection circuitry further circulates values from an imaginary part of said selected row between said second set of second input registers and said second circular latch.

10. The method of claim 8 further comprising configuring logic of said programmable integrated circuit device as preprocessing circuitry that performs a preprocessing operation on said selected row.

11. The method of claim 10 wherein said configuring logic of said programmable integrated circuit device as preprocessing circuitry comprises configuring logic of said programmable integrated circuit device to perform said preprocessing operation during loading of said selected row into said column memories.

12. The method of claim 11 wherein said configuring logic of said programmable integrated circuit device as preprocessing circuitry comprises configuring logic of said programmable integrated circuit device to perform said preprocessing operation after loading of said selected row into said column memories.

13. The method of claim 10 wherein:
said preprocessing operation is an operation that also is performed later in said vector operation; and
said configuring logic of said programmable integrated circuit device as preprocessing circuitry comprises configuring logic of said programmable integrated circuit device to perform said preprocessing operation later in said vector operation.

14. The method of claim 8 wherein:
configuring logic of said programmable integrated circuit device as a first circular latch comprises configuring a plurality of memories arranged in a number of circular latch columns equal to said second number, and a number of circular latch rows equal to said multiple rows; and
configuring logic of said programmable integrated circuit device as selection circuitry for circulating values from said selected row between said first set of second input registers and said first circular latch comprises configuring multiplexing circuitry for selectably accepting input into each of at least some of said circular latch rows from one of (a) another of said circular latch rows, and (b) said second input registers.

15. A machine-readable data memory medium encoded with machine-executable instructions for configuring a programmable integrated circuit device as matrix operations circuitry for performing a vector operation on an input matrix having a first number of columns, said vector operation including operations combining one row of said matrix and each row of said matrix, said instructions comprising:
instructions to configure logic of said programmable integrated circuit device as a first set of a second number of column memories, said second number being smaller than said first number, whereby at least one row of said input matrix is stored in multiple rows of said column memories;
instructions to configure logic of said programmable integrated circuit device as a vector operations circuit that performs said operations combining a selected row of said matrix and each row of said matrix;
instructions to configure logic of said programmable integrated circuit device as a first set of first input registers equal in number to said second number, for inputting each said row to said vector operations circuit from said column memories;
instructions to configure logic of said programmable integrated circuit device as a first set of second input registers equal in number to said second number, for inputting said one row to said vector operations circuit;
instructions to configure logic of said programmable integrated circuit device as a first circular latch for storing said one row; and
instructions to configure logic of said programmable integrated circuit device as selection circuitry for circulating values from said selected row between said first set of second input registers and said first circular latch.

16. The machine-readable data memory medium of claim 15 wherein, for configuring said programmable integrated circuit device to perform complex operations, said instructions further comprise:
instructions to configure logic of said programmable integrated circuit device as a second set of said second number of column memories for storing an imaginary part of said input matrix;
instructions to configure logic of said programmable integrated circuit device as a second set of first input registers equal in number to said second number, for inputting an imaginary part of each said row to said vector operations circuit from said column memories;
instructions to configure logic of said programmable integrated circuit device as a second set of second input registers equal in number to said second number, for inputting an imaginary part of said one row to said vector operations circuit;
instructions to configure logic of said programmable integrated circuit device as a second circular latch for storing an imaginary part of said one row; and
instructions to configure said selection circuitry to circulates values from an imaginary part of said selected row between said second set of second input registers and said second circular latch.

17. The machine-readable data memory medium of claim 16 wherein said instructions further comprise instructions to configure logic of said programmable integrated circuit device as preprocessing circuitry that performs a preprocessing operation on said selected row.

18. The machine-readable data memory medium of claim 17 wherein said instructions to configure logic of said programmable integrated circuit device as preprocessing circuitry comprise instructions to configure logic of said programmable integrated circuit device to perform said preprocessing operation during loading of said selected row into said column memories.

19. The machine-readable data memory medium of claim 18 wherein said instructions to configure logic of said programmable integrated circuit device as preprocessing circuitry comprise instructions to configure logic of said programmable integrated circuit device to perform said preprocessing operation after loading of said selected row into said column memories.

20. The machine-readable data memory medium of claim 17 wherein:
said preprocessing operation is an operation that also is performed later in said vector operation; and
said instructions to configure logic of said programmable integrated circuit device as preprocessing circuitry comprise instructions to configure logic of said programmable integrated circuit device to perform said preprocessing operation later in said vector operation.

21. The machine-readable data memory medium of claim 15 wherein:
said instructions to configure logic of said programmable integrated circuit device as a first circular latch comprise instructions to configure a plurality of memories arranged in a number of circular latch columns equal to said second number, and a number of circular latch rows equal to said multiple rows; and
said instructions to configure logic of said programmable integrated circuit device as selection circuitry for circulating values from said selected row between said first set of second input registers and said first circular latch comprise instructions to configure multiplexing circuitry for selectably accepting input into each of at least some of said circular latch rows from one of (a) another of said circular latch rows, and (b) said second input registers.

* * * * *